US008988525B2

(12) United States Patent
Thompson et al.

(10) Patent No.: US 8,988,525 B2
(45) Date of Patent: Mar. 24, 2015

(54) SYSTEM AND METHOD FOR PROVIDING GUIDANCE INFORMATION TO A DRIVER OF A VEHICLE (75) Inventors: Justin Thompson, Royal Oak, MI (US); Gunter Rottner, Wixom, MI (US); Alexander Latysh, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 880 days.

(21) Appl. No.: 12/548,639

(22) Filed: Aug. 27, 2009

(65) Prior Publication Data

US 2011/0050886 A1 Mar. 3, 2011

(51) Int. Cl.
*H04N 7/18* (2006.01)
*B60R 1/00* (2006.01)
*G01S 13/86* (2006.01)
*G01S 13/93* (2006.01)

(52) U.S. Cl.
CPC .............. *B60R 1/00* (2013.01); *G01S 13/867* (2013.01); *B60R 2300/301* (2013.01); *B60R 2300/304* (2013.01); *B60R 2300/306* (2013.01); *G01S 13/86* (2013.01); *G01S 13/931* (2013.01); *G01S 2013/9378* (2013.01); *G01S 2013/9389* (2013.01)
USPC ........................................................... 348/148

(58) Field of Classification Search
None
See application file for complete search history.

(56) References Cited

U.S. PATENT DOCUMENTS

| 5,289,321 | A | 2/1994 | Secor |
| 5,574,443 | A | 11/1996 | Hsieh |
| 5,670,935 | A | 9/1997 | Schofield et al. |
| 5,949,331 | A | 9/1999 | Schofield et al. |
| 6,222,447 | B1 | 4/2001 | Schofield et al. |
| 6,254,127 | B1 | 7/2001 | Breed et al. |
| 6,327,522 | B1 * | 12/2001 | Kojima et al. ................ 348/115 |
| 6,400,831 | B2 | 6/2002 | Lee et al. |
| 6,424,272 | B1 | 7/2002 | Gutta et al. |
| 6,484,080 | B2 | 11/2002 | Breed |
| 6,593,960 | B1 * | 7/2003 | Sugimoto et al. ............ 348/148 |
| 6,618,672 | B2 | 9/2003 | Sasaki et al. |
| 6,662,642 | B2 | 12/2003 | Breed et al. |

(Continued)

FOREIGN PATENT DOCUMENTS

GB 2301922 12/1996
JP 2002-359838 12/2002

(Continued)

OTHER PUBLICATIONS

Automatic Adjustable Rear and Side Mirrors Tracking System, disclosed by IBM, UTC English, Sep. 17, 2008.

(Continued)

*Primary Examiner* — Thomas Dailey
*Assistant Examiner* — Nam Tran
(74) *Attorney, Agent, or Firm* — Michael Best & Friedrich LLP (57) ABSTRACT

A system for providing guidance information to a driver of a vehicle. In one implementation, the system includes an image capture device and an object sensor attached to the vehicle. The image capture device acquires an image of the vicinity of the vehicle. The object sensor is configured to detect an object near the vehicle. A processing unit processes the acquired image from the image capture device to produce an output image. The processing of the acquired image is based on information obtained from the object sensor. An image display unit is connected to the processing unit and displays the output image produced by the central processing unit.

14 Claims, 7 Drawing Sheets

(56) References Cited

U.S. PATENT DOCUMENTS

| | | |
|---|---|---|
| 6,734,896 B2 | 5/2004 | Nobori et al. |
| 6,746,078 B2 | 6/2004 | Breed |
| 6,749,218 B2 | 6/2004 | Breed |
| 6,820,897 B2 | 11/2004 | Breed et al. |
| 6,856,873 B2 | 2/2005 | Breed et al. |
| 6,923,080 B1 | 8/2005 | Dobler et al. |
| 6,933,837 B2 | 8/2005 | Gunderson et al. |
| 6,970,579 B1 | 11/2005 | Thornton |
| 7,049,945 B2 | 5/2006 | Breed et al. |
| 7,161,616 B1 | 1/2007 | Okamoto et al. |
| 7,209,221 B2 | 4/2007 | Breed et al. |
| 7,218,758 B2 * | 5/2007 | Ishii et al. ............... 348/E7.086 |
| 7,227,459 B2 | 6/2007 | Bos et al. |
| 7,227,893 B1 | 6/2007 | Srinivasa et al. |
| 7,317,813 B2 | 1/2008 | Yanagawa et al. |
| 7,359,782 B2 | 4/2008 | Breed |
| 7,444,003 B2 | 10/2008 | Laumeyer et al. |
| 7,460,951 B2 | 12/2008 | Altan et al. |
| 7,576,767 B2 | 8/2009 | Lee et al. |
| 7,630,806 B2 | 12/2009 | Breed |
| 2005/0046584 A1 | 3/2005 | Breed |
| 2005/0192725 A1 | 9/2005 | Li |
| 2006/0125919 A1 | 6/2006 | Camilleri et al. |
| 2007/0182528 A1 | 8/2007 | Breed et al. |
| 2007/0182623 A1 | 8/2007 | Zeng et al. |
| 2007/0244641 A1 | 10/2007 | Altan et al. |
| 2007/0285510 A1 | 12/2007 | Lipton et al. |
| 2008/0040004 A1 | 2/2008 | Breed |
| 2008/0100704 A1 | 5/2008 | Venetianer et al. |
| 2008/0100706 A1 | 5/2008 | Breed |
| 2008/0117296 A1 | 5/2008 | Egnal et al. |
| 2008/0157510 A1 | 7/2008 | Breed et al. |
| 2008/0187047 A1 | 8/2008 | Stephan et al. |

FOREIGN PATENT DOCUMENTS

| | | |
|---|---|---|
| JP | 2005-328181 | 11/2005 |
| JP | 2006-1331166 | 5/2006 |
| JP | 2006-279511 | 10/2006 |
| WO | 96/38319 | 12/1996 |
| WO | 02/20287 | 3/2002 |

OTHER PUBLICATIONS

Linan-Cembrano, et al., "Insect-Vision Inspired Collision Warning Vision Processor for Automobiles", IEEE Circuits and Systems Magazine, vol. 8, No. 2, pp. 6-24, IEEE, Second Quarter 2008.

Sosa, Rene., et al., "Obstacles Detection and Collision Avoidance System Developed with Virtual Models", Proceedings of the 2007 IEEE International Conference on Vehicular Electronics and Safety, pp. 269-276, 2007.

Sotelo, M.A., et al., "Vision-Based Blind Spot Detection Using Optical Flow", Computer Aided Systems Theory—EUROCAST 2007, 11th International, Conference on Computer Aided Systems Theory, Revised Selected Papers (Lecture Notes in Computer Science, vol. 4739), pp. 1113-1118, 2007.

Sengupta, Raja., et al., "Cooperative Collision Warning Systems: Concept Definition and Experimental Implementation", Journal of Intelligent Transportation Systems, vol. 11, No. 3, pp. 143-155, 2007.

Moon, Jaekyoung, et al., "An Automotive Detector Using Biologically Motivated Selective Attention Model for a Blind Spot Monitor", Neural Information Processing, 13th International Conference, ICONIP 2006 Proceedings, Part II (Lecture Notes in Computer Science vol. 4233), pp. 466-473, 2006.

Japanese Patent Office Action for Application No. 2010-190269 dated Aug. 4, 2014 (6 pages—with English Translation).

* cited by examiner

SYSTEM AND METHOD FOR PROVIDING GUIDANCE INFORMATION TO A DRIVER OF A VEHICLE

BACKGROUND

The present invention relates to a system and a method for producing enhanced video images of an area surrounding a vehicle based on detection of objects near the vehicle.

Many vehicles are being equipped with video camera systems which provide drivers with live images of the surroundings of the vehicle. Providing such images to a driver helps improve safety and facilitate difficult driving maneuvers such as parking or maneuvering through heavy traffic. Vehicles are also being equipped with object sensors which warn the driver of the presence of objects in the vicinity of the vehicle, again to assist the driver with difficult driving maneuvers.

SUMMARY

What is needed is a way to combine the information from the video camera systems and the object sensors so as to provide improved information to a driver and to further assist the driver in difficult driving situations.

Thus, in one embodiment, the invention provides a system for providing guidance information to a driver of a vehicle. The system includes an image capture device attached to the vehicle. The image capture device is configured to acquire an image of the vicinity of the vehicle. The system also includes an object sensor that is attached to the vehicle and is configured to detect an object near the vehicle; and a central processing unit configured to process the acquired image from the image capture device to produce an output image. Processing of the acquired image is based on information obtained from the object sensor. The system also includes an image display unit mounted in the vehicle that is configured to display the output image produced by the central processing unit.

In another embodiment, the invention provides a method of providing guidance information to a driver of a vehicle. The method includes obtaining an acquired image from an image capture device attached to the vehicle; detecting an object near the vehicle using an object sensor attached to the vehicle; and processing the acquired image using a central processing unit associated with the vehicle to produce an output image. Processing of the acquired image is based on information obtained from the object sensor. The method also includes displaying the output image produced by the central processing unit on an image display unit mounted in the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the present invention include methods and systems to provide the driver of a vehicle with improved information while maneuvering the vehicle. In general, the methods and systems combine information from image capture devices and object sensors associated with the vehicle to produce a more informative image display for the driver. The methods and systems disclosed herein may be used in a number of vehicles, such as passenger cars, vans, trucks, SUVs, buses, etc.

Figure 1:
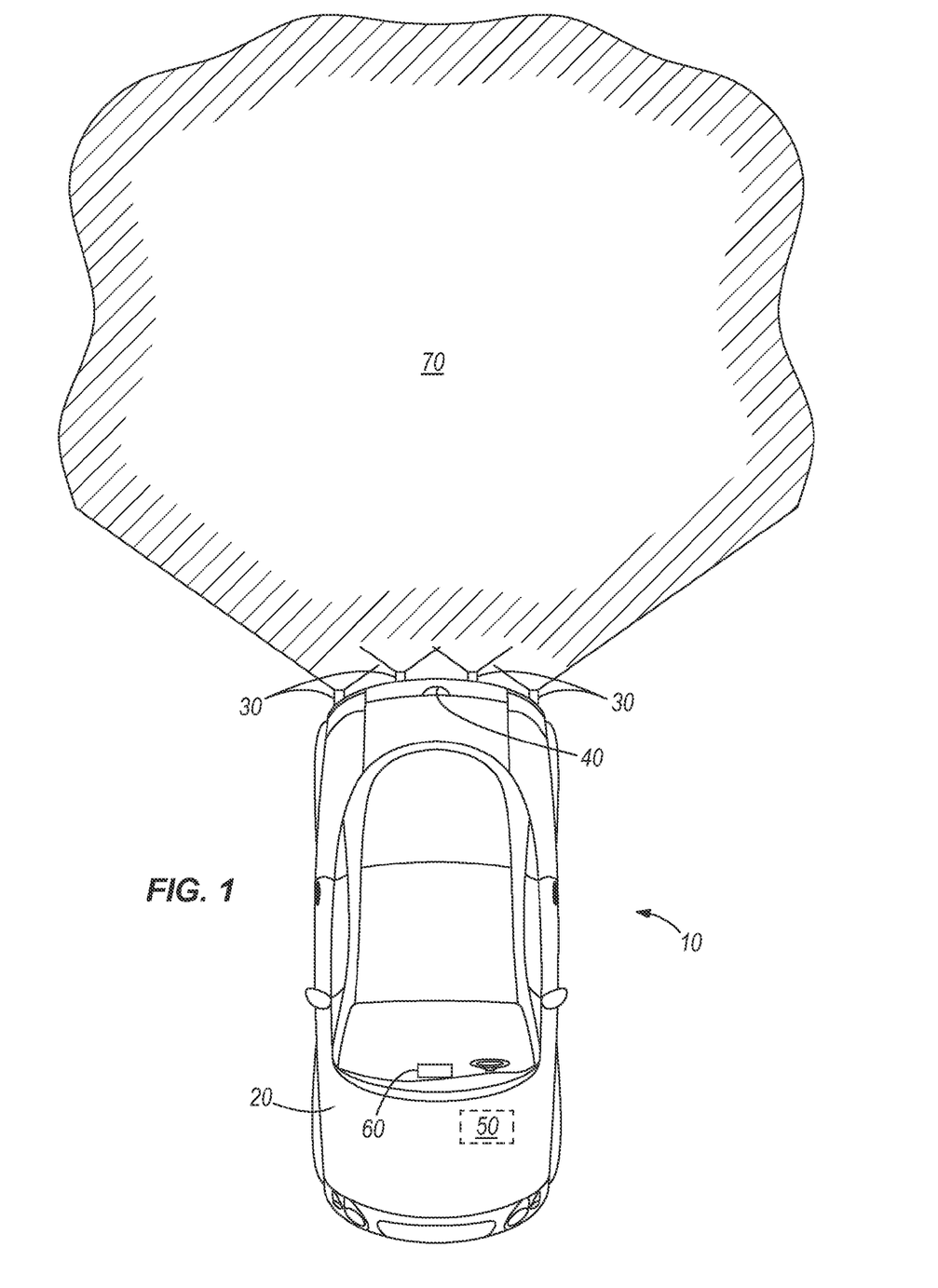
FIG. 1 shows a vehicle equipped with an object detection and video guidance system in accordance with an embodiment of the present invention.

A system 10 according to embodiments of the invention includes a vehicle 20 having one or more object sensors 30 and one or more image capture devices 40 associated therewith (FIG. 1). The vehicle 20 also has a central processing unit (CPU) 50 and display 60 associated therewith. In various embodiments, the CPU 50 controls operation of the object sensors 30, image capture devices 40, and display 60, and processes the images obtained from the image capture devices 40 according to information obtained from the object sensors 30 (FIG. 1).

Figure 2:
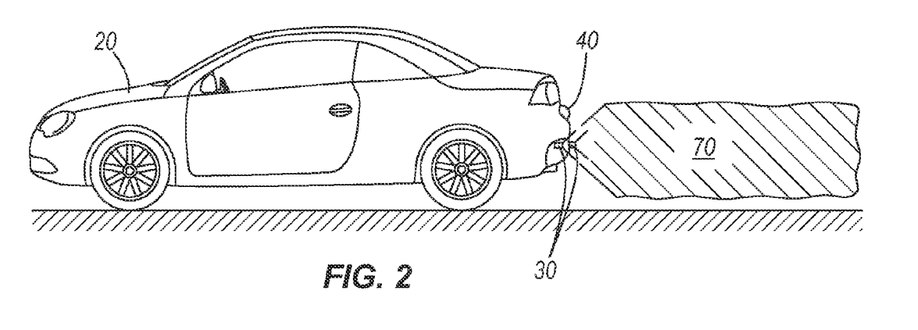
FIG. 2 shows a vehicle equipped with an object detection and video guidance system in accordance with an embodiment of the present invention.

In various embodiments, the object sensors 30 are attached to one or more of the sides, rear, or front of the vehicle 20 (FIGS. 1, 2). Depending on the type of object sensor 30 that is used, the object sensor 30 may map the sensed area and report the size and location of one or more objects near the vehicle 20. The object can be a stationary object, such as a wall, a parked vehicle, or a utility pole, or a moving object, such as a pedestrian or a moving vehicle. In some embodiments, each individual object sensor 30 may be capable of determining the size and location of nearby objects. In other embodiments a single object sensor 30 may only be able to determine the distance of nearby objects from the object sensor 30 and the combined information from an array of object sensors 30 would be needed to determine the size and location of nearby objects, e.g. by triangulation. In various embodiments, the object sensors 30 may be based on ultrasonic measurements, time-of-flight measurements, (e.g., using infrared light or ultrasound) radar, capacitive sensing, or combinations thereof, although other object sensing technologies may also be incorporated into the system 10. In certain embodiments, there are a plurality of ultrasonic-based object sensors 30 arrayed across the rear of the vehicle 20, for example along the rear bumper. In one particular embodiment, there are four ultrasonic-based object sensors 30 on the rear bumper of the vehicle 20, with one object sensor 30 at each of the ends of the bumper and the remaining object sensors 30 spaced at locations in between.

The object sensors 30 can detect various regions near the vehicle 10. In some embodiments, the object sensors 30 collect information from a horizontal sensing region 70 behind the vehicle 10 which begins about ten centimeters from the ground and continues to about two hundred and fifty centimeters from the ground (FIGS. 1, 2). The sensing region 70 may extend ten meters rearward of the vehicle 10 and extend laterally by up to five meters. Other sensing regions 70 can be configured using a variety of sensing technologies and by the addition of multiple object sensors 30 at various locations and orientations around the perimeter of the vehicle 10. The spatial resolution of the object sensors 30 varies depending on the type of sensing technology that is used; for ultrasonic-based object sensors 30, the spatial resolution is about five centimeters, although technologies having lesser or greater resolution can also be used.

Although the present discussion focuses on object sensors 30, image capture devices 40, and objects near the rear of a vehicle that is operating in reverse, the various elements of the system 10 can also be attached to the front or sides, or both, of the vehicle 20 and can be used to assist the driver in operating the vehicle 20 in other situations besides operating in reverse. In certain embodiments in which the system 10 operates while the vehicle 20 is moving forward, the system 10 may only show an image on the display 60 if the vehicle 20 is moving slowly, for example at or below ten miles per hour. In general the display 60 is disposed in a location that is readily visible to the driver of the vehicle 20, for example on the dashboard.

The object sensors 30 provide information regarding nearby objects, including the size of the objects and their location relative to the vehicle 20. When combined with other information, such as the location of the vehicle 20 and the vehicle's rate and direction of movement, the system 10 can determine whether the objects are moving and in what direction, and whether the objects are or will be in the vehicle's projected path of movement. Information regarding the location of the vehicle 20 as well as the rate and direction of movement of the vehicle 20 can be obtained from one or more of a global positioning system (GPS), accelerometers, and wheel speed sensors associated with the vehicle 20. As discussed further below, events that trigger the system 10 to produce an altered image output include the presence of a nearby object, the size of the object, how close the object is to the vehicle 20, whether the object is moving and the rate of such movement, whether the object is in or is predicted to enter the vehicle's 20 projected path of movement, and whether the object falls within a predetermined region of the field of view of the image capture device 40. Still another event that can trigger the system 10 to produce an altered image is when the vehicle 20 moves from a confined space having objects close to either side of the vehicle 20 (e.g. as in an alleyway or between two parked vehicles) to an open space.

Figure 3:
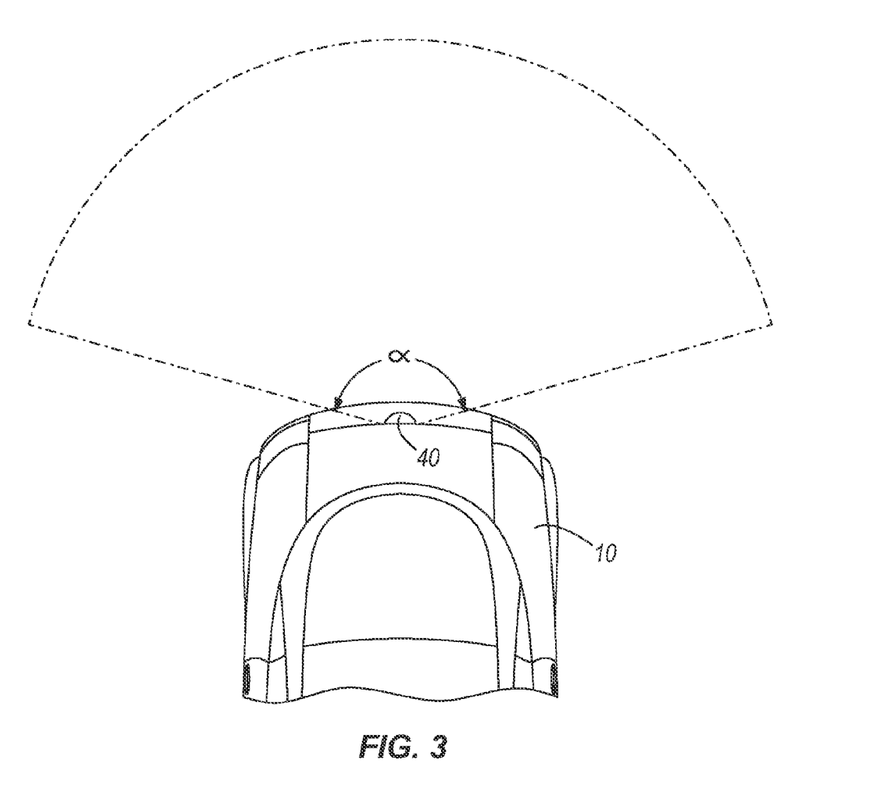
FIG. 3 shows the rear portion of a vehicle equipped with an object detection and video guidance system.

One or more image capture devices 40 (for example, a digital camera) may be used with the system 10 (FIGS. 1-3). In some embodiments, the image capture device 40 has a wide angle lens attached thereto, so that the image capture device 40 has an enhanced field of view. In certain embodiments, the horizontal field of view of the wide-angle lens is enhanced to an angle of approximately $\alpha=180°$ about a vertical axis located at the lens (FIG. 3), while the field of view in the vertical direction may be the same as in a conventional lens. In other embodiments, the field of view of the lens that is attached to the image capture device 40 has an angle of $\alpha=150°$ about a vertical axis, although other sizes and proportions of the field of view are possible. In certain embodiments, the system 10 includes algorithms to provide distortion correction to the images obtained using a wide-angle lens, which may appear distorted (particularly at the edges).

In certain embodiments, image information from a plurality of image capture devices 40 is combined in order to provide additional information to the driver of the vehicle 20. The image capture devices 40 may be located at the rear, sides, or front of the vehicle 20. The image capture device 40 can use a number of detection technologies, such as a charge-coupled device (CCD) or similar detector, which can deliver a series of images to the CPU 50. In one particular embodiment, the image capture device 40 includes a 640×480 pixel CCD chip, although detectors with other pixel numbers and aspect ratios are also possible. In various embodiments, the image capture device 40 delivers at least one, five, ten, twenty, thirty, or more images per second to the CPU 50, although other rates are also possible.

The CPU 50 can include a processor, memory or other computer-readable media, and input/output mechanisms. The CPU 50 is configured to receive information from the object sensors 30 and the image capture device 40, to process the images captured by the image capture device 40 according to the information from the object sensors 30, and to transmit an output signal to the display 60. In various embodiments, the output from the CPU 50 may also or alternatively include sounds (e.g., a warning buzzer, bell, synthesized voice, etc.), tactile or movement (e.g. vibration of a part of the vehicle 20 such as the seat or steering wheel), light (e.g. flashing light), or other form of communication with one or more occupants of the vehicle 20, including the driver. The CPU 50 may communicate with the image capture device 40, the object sensors 30, the display 60, and other elements of the system 10 using wired or wireless modes of communication. The CPU 50 may include program instructions on a computer-readable medium and may further include memory for storing information. In various embodiments, the system 10 includes one or more of the elements disclosed herein along with appropriate program instructions on the CPU 50 for carrying out embodiments of the invention. Thus, in one or more embodiments, the system 10 produces a modified image output based on data obtained from object sensors 30 regarding objects which are in the vicinity of the vehicle 20.

Top View

Figure 4:
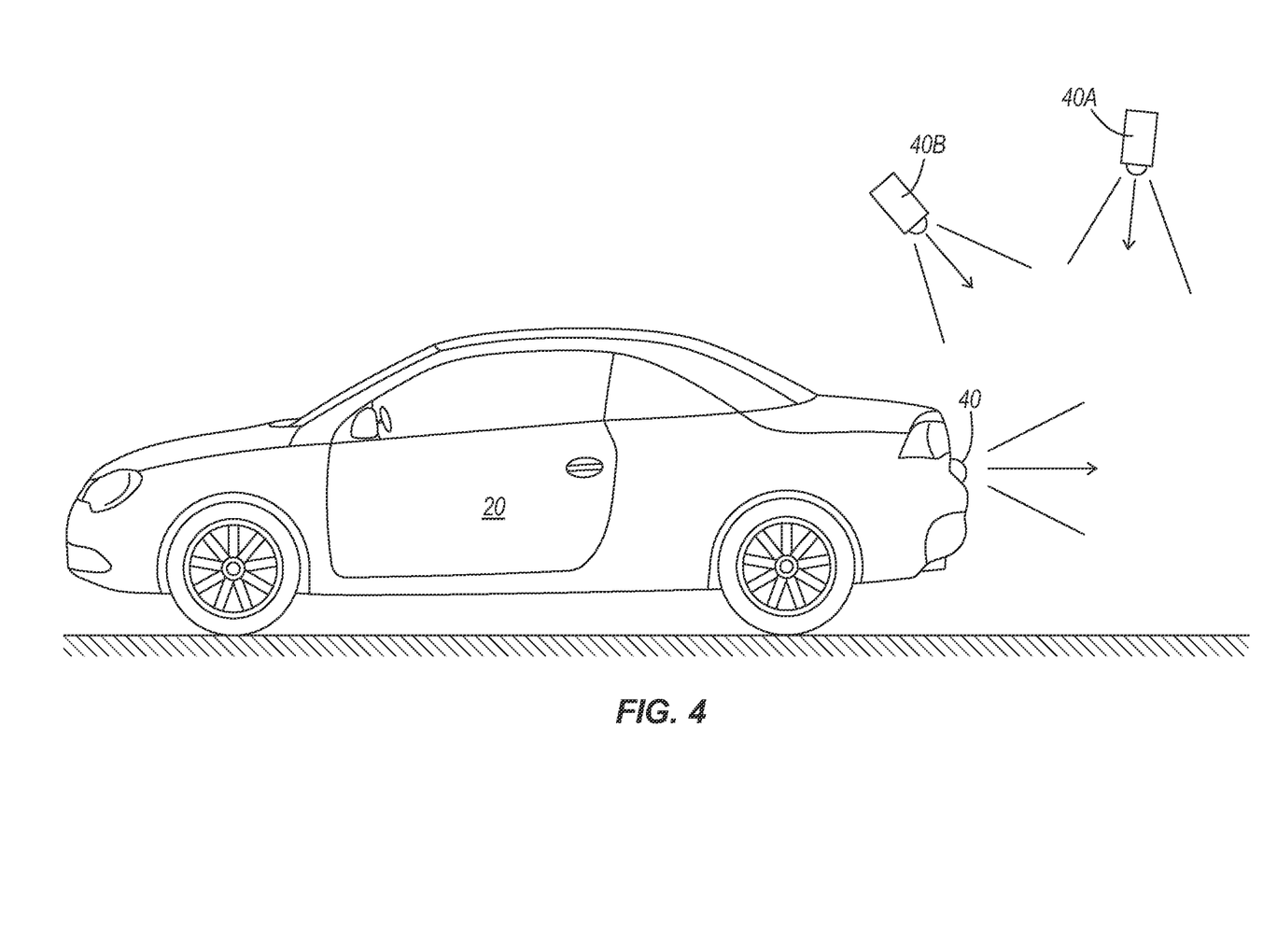
FIG. 4 shows actual and simulated viewpoints of the image capture device.

In one such embodiment, the system 10 creates a simulated top view from the image data obtained from the image capture device 40. The simulated top view is generated by re-mapping (e.g. using orthogonal projection) the pixel information from the images obtained from the horizontally-directed image capture device 40 to produce an image which appears that it was captured from a device located directly above the vehicle 20 (FIG. 4). The original image (see Table I, "view-mode 1") and the simulated top view image (see Table I, "view-mode 2") are then combined to varying degrees (e.g., using morphing techniques) to produce a hybrid image that appears to have been captured from a device that is located at an angle with respect to the vehicle 20, the angle being intermediate between the angle of the horizontally-oriented original image and the orthogonally-oriented simulated top view image. As shown in FIG. 4, the original image taken by the image capture device 40 is in a direction that is approximately parallel to the driving surface. Re-sampling this information, for example using orthogonal projection, generates an image which appears to have been taken by an image capture device 40A in a direction that is approximately perpendicular to the driving surface (FIG. 4). Finally, the hybrid image that is formed by combining the originally-captured image with the simulated top view image produces an image that appears to have been taken by an image capture device 40B in a direction that is between that of the actual image capture device 40 and the simulated image capture device 40A (FIG. 4).

The event that triggers display of a hybrid view image can include the presence of an object in the projected path of the vehicle. Table I shows one possible relationship between the proximity of the object to the vehicle 20, as reported by the object sensors 30, and the relative percentages of the original image ("view-mode 1") and the simulated top-view image ("view-mode 2") by which the images are combined to produce the output image shown on the display 60. Thus, as the distance between the object and the vehicle 20 decreases, the output image contains a greater percentage of the top view image relative to the original image, drawing the driver's attention to the presence of the object and providing a better view of the relative positions of the vehicle 20 and the object. While Table I shows the changes of simulated view angle as occurring in a series of discrete steps, in various embodiments the changes occur continuously with changes in the distance between the object and the vehicle 20. In still other embodiments the changes in view of the hybrid image can occur in discrete steps as shown in Table I, but with a finer or lower level of resolution.

TABLE I

| Obstacle Distance Measured within FOV (m) | Percentage of view-mode 1 (Normal Distortion Correction) (%) | Percentage of view-mode 2 (Top-view) (%) |
| --- | --- | --- |
| 2.2 | 100 | 0 |
| 2.1 | 95 | 5 |
| 2 | 90 | 10 |
| 1.9 | 85 | 15 |
| 1.8 | 80 | 20 |
| 1.7 | 75 | 25 |
| 1.6 | 70 | 30 |
| 1.5 | 65 | 35 |
| 1.4 | 60 | 40 |
| 1.3 | 55 | 45 |
| 1.2 | 50 | 50 |
| 1.1 | 45 | 55 |
| 1 | 40 | 60 |
| 0.9 | 35 | 65 |
| 0.8 | 30 | 70 |
| 0.7 | 25 | 75 |
| 0.6 | 20 | 80 |
| 0.5 | 15 | 85 |
| 0.4 | 10 | 90 |
| 0.3 | 5 | 95 |
| 0.2 | 0 | 100 |

Rear Cross Path

Figure 5A:
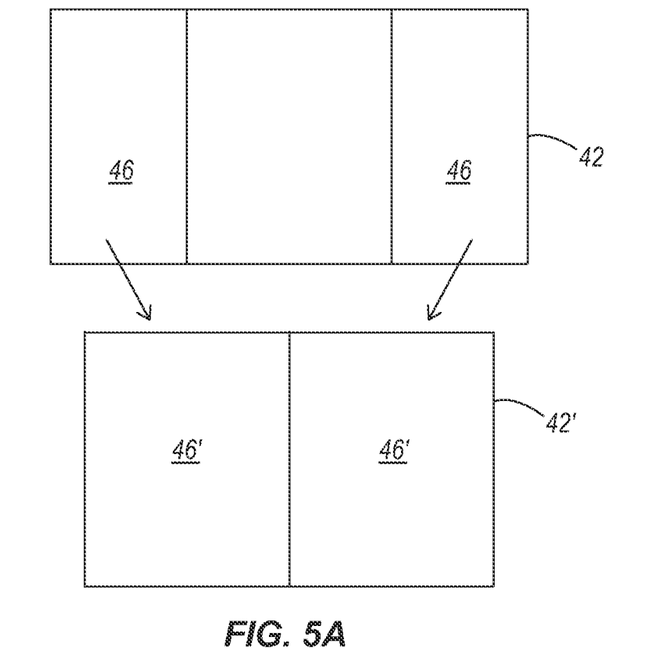
FIG. 5A shows the relationship between the field of view of a captured image and the field of view of a modified display.
Figure 6A:
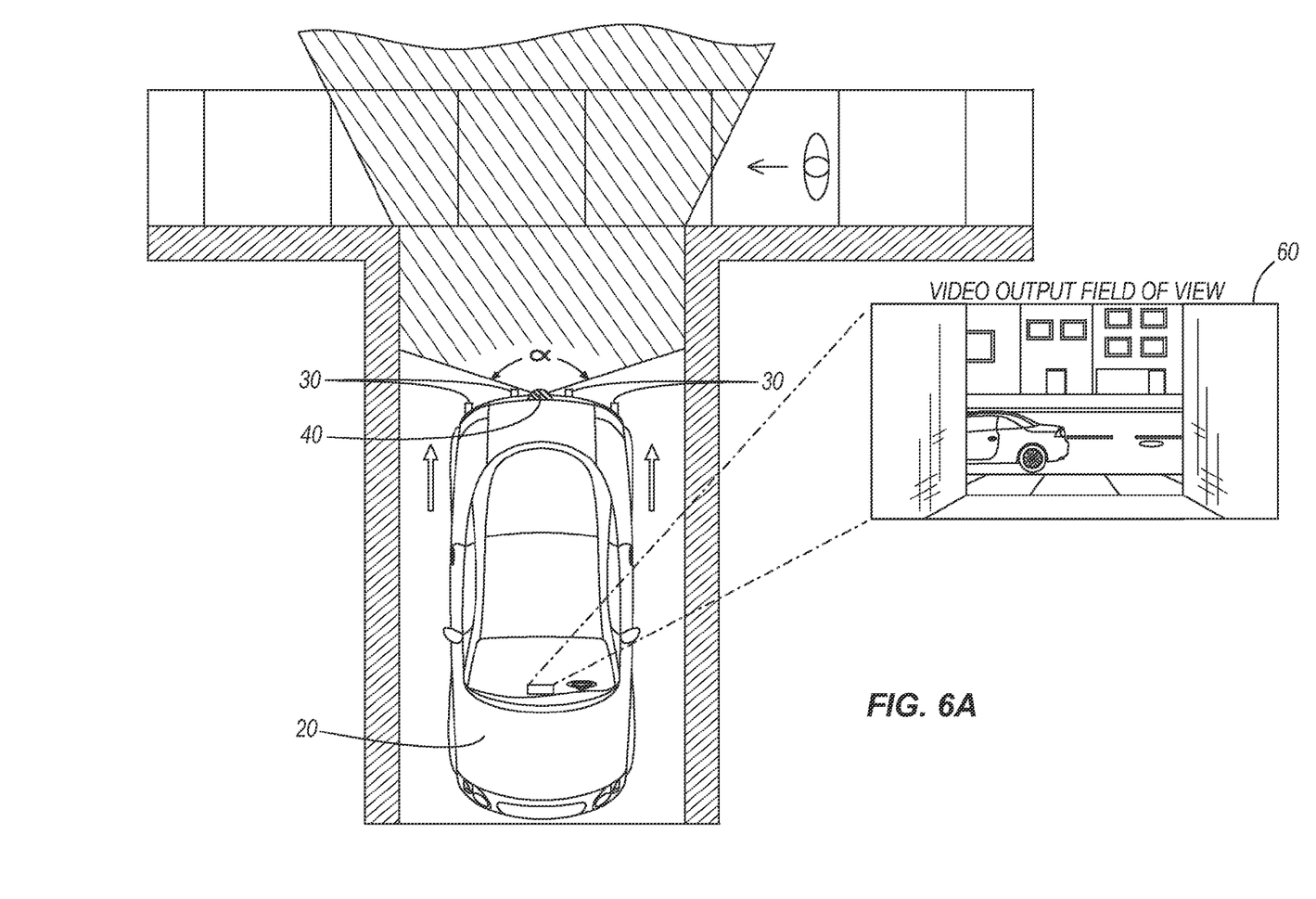
FIGS. 6A and 6B show how an object is detected in the rear, cross-path and how the image display is modified when an object is detected.
Figure 6B:
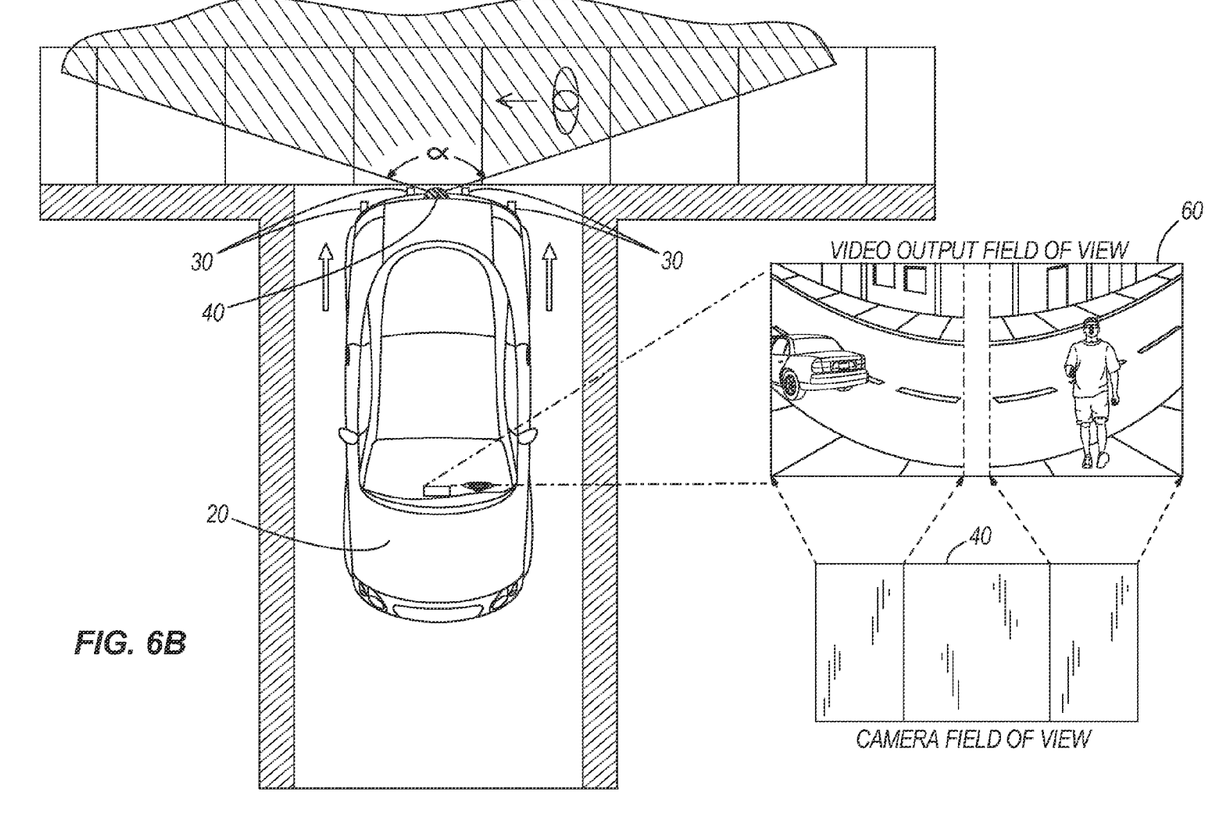

In another embodiment, the system 10 alters the output image to increase the proportion of the lateral portions 46 of the image 42 from the image capture device 40 which are shown on the display 60, so that the modified portions 46' comprise most or all of the modified output image 42' (FIG. 5A). In other embodiments, the lateral portions of the image are orthogonally projected in order to make it appear that the lateral portions of the image were captured by a device pointing towards the sides, giving the driver a more direct view of objects on the sides of the vehicle 20 (FIGS. 6A, 6B). In one embodiment, both left and right portions (e.g., the outer one-fourth to one-third of the acquired image on either side, or other size portions) of the acquired image are orthogonally projected and increased in size so that each lateral portion occupies almost or an entire half of the output image. The enhanced subregion(s) may be combined (e.g., through morphing techniques) with the original, acquired image in varying degrees as a function of the proximity of the object to the vehicle 20, in a discrete, stepwise manner or in a continuous or near-continuous transition. Although the video output field of view of display 60 in FIG. 6B depicts a portion of the original, acquired image being displayed between the enhanced subregions, in some embodiments, the entire original, acquired image is eliminated and only the two enhanced subregions are displayed (adjacent one another).

In other embodiments, only one side or the other of the acquired image is enhanced depending on factors such as whether an object is present and, if so, whether the object is moving and which side of the vehicle 20 the object is currently located. Another situation that may trigger the system 10 to enhance the lateral portions of the displayed image is if the vehicle 20 moves from a confined space (e.g., in a narrow alleyway or between two other vehicles) to an open space, insofar as an object such as another vehicle or a pedestrian may be in the open space.

Figure 5B:
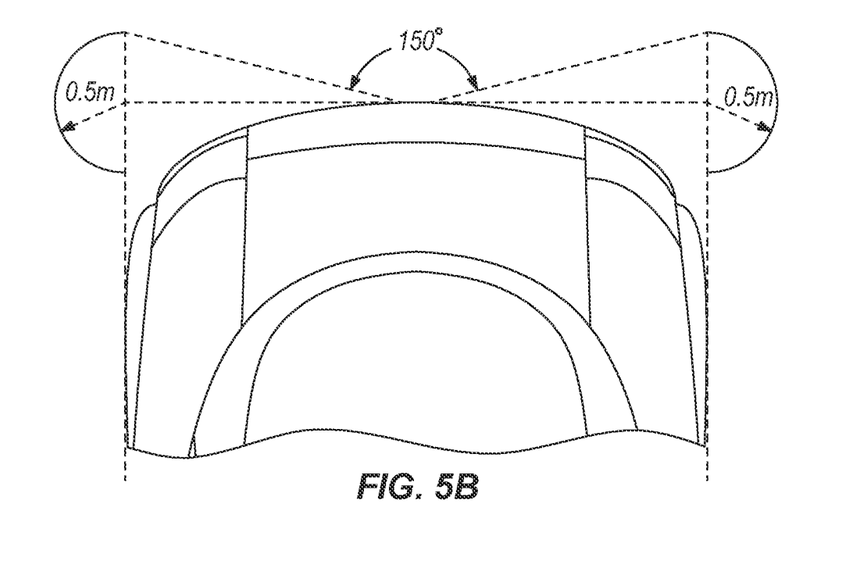
FIG. 5B shows a rear, cross-path field of view of a captured image.

In certain embodiments, a rear cross path field of view is defined, such that if an object is detected within this field of view on one or both sides of the vehicle 20, then one or both of the lateral portions of the image are enhanced as discussed above. For example, the rear cross path field of view can be defined as a semicircular region adjacent to the rear of the vehicle 20, which in one particular embodiment has a radius of a half meter and corresponds to the outermost fifteen degrees of the field of view of a rear-facing, wide-angle camera having a viewing angle of $\alpha=180°$ (FIG. 5B), although other rear cross path fields of view may also be defined.

Object-Focused Magnification

Figure 7:
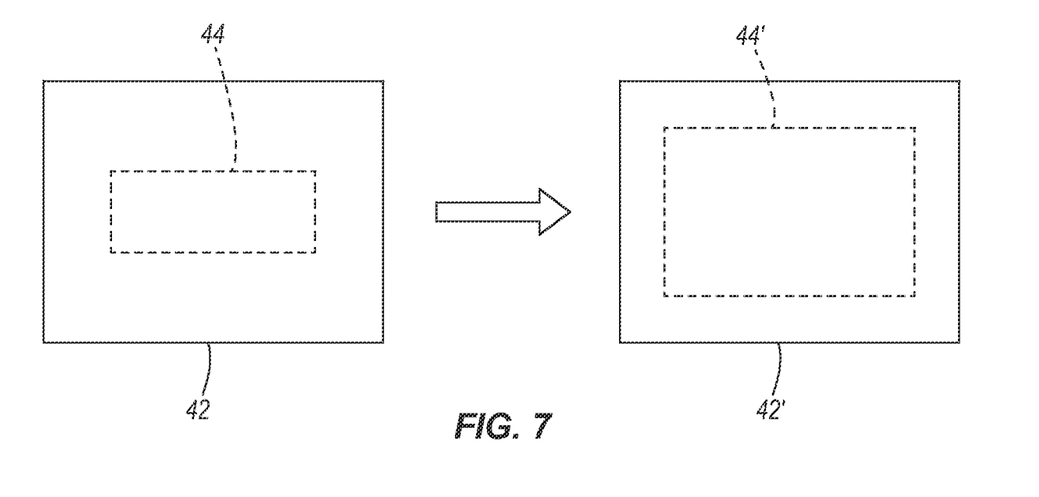
FIG. 7 shows an example of how the field of view is modified for object-focused modification.

In still another embodiment, the system 10 enhances a subregion 44 of an image 42 that is acquired by the image capture device 40 in order to draw the driver's attention to an object (e.g. a trailer hitch) within the subregion 44 which is close to the vehicle 20 (e.g. within thirty to fifty centimeters) (FIG. 7). In various embodiments, the enhancement of the subregion 44 of the image 42 may include enlarging the subregion 44 and orthogonally projecting the subregion 44 in order to provide a more direct view of the object in the subregion 44. The enhanced subregion 44' may be combined (e.g., through morphing techniques) with the acquired image 42 to varying degrees as a function of the proximity of the object to the vehicle 20, in a discrete, stepwise manner or in a continuous or near-continuous transition to produce a modified image 42' to show on the display 60. The enhanced subregion 44' may be displayed alone, or may be combined with the acquired image to produce a "magnifying glass" effect in which the peripheral regions of the acquired image can still be seen and help give the driver context as to how the magnified portion of the image relates to the remainder of the scene (FIG. 7).

The subregion 44 to be enhanced can be defined in various ways, for example as one or more boxes, rectangles, circles, or other shapes in a particular region (e.g., the center) or regions of the field of view of the image capture device 40. Alternatively or in addition, the system 10 may automatically create a subregion to correspond to an area in the field of view in which an object is determined to be close to the vehicle 20.

The alteration of the displayed image from one mode to another, e.g., from a conventional view that corresponds to the acquired image to an enhanced view as described herein, may occur in a single frame or may be transitioned gradually over a series of frames, to help provide context for the driver to understand the relationship between the views. The information from the sensors 30 and image capture device 40 can be continuously provided to the CPU 50 for continuous updates of the acquired images and any related altered images being displayed.

Thus, the invention provides, among other things, a new and useful system and method for providing guidance information to a driver of a vehicle. Various features and advantages of the invention are set forth in the following claims.

What is claimed is:

1. A system for providing guidance information to a driver of a vehicle, comprising:
   an image capture device configured to acquire an image of the vicinity of the vehicle;
   an object sensor configured to detect an object near the vehicle and determine a distance between the object and the vehicle;
   a processing unit connected to the image capture device and to the object sensor, the processing unit configured to produce a simulated image that appears as if it was captured from a simulated image capture device located directly above the vehicle, by orthogonally projecting the acquired image and combine the simulated image with the acquired image in a proportion and having a simulated angle of observation that is determined by the distance between the object and the vehicle to produce an output image that appears to have been taken by an image capture device in a direction that is between that of the actual image capture device and the simulated image capture device; and
   an image display unit connected to the processing unit and configured to display the output image produced by the processing unit.

2. The system of claim 1, wherein the processing of the acquired images by the central processing unit is performed continuously based on the information obtained from the object sensor.

3. The system of claim 1, wherein the image capture device is attached to the rear of the vehicle and includes a wide-angle lens.

4. The system of claim 1, wherein the object sensor comprises an ultrasonic-based object sensor.

5. The system of claim 1, wherein the proportion of the simulated image increases as the distance between the object and the vehicle decreases.

6. The system of claim 1, wherein the proportion is determined using a lookup table.

7. The system of claim 1, wherein the simulated image and the acquired image are combined using morphing techniques.

8. A method of providing guidance information to a driver of a vehicle, comprising:
   obtaining an acquired image from an image capture device attached to the vehicle;
   detecting a distance between an object and the vehicle using an object sensor attached to the vehicle;
   processing the acquired image using a central processing unit associated with the vehicle to produce an output image, wherein processing of the acquired image comprises producing a simulated image that appears as if it was captured from a simulated image capture device located directly above the vehicle, by orthogonally projecting the acquired image and combining the simulated image with the acquired image in a proportion and having a simulated angle of observation that is determined by the distance between the object and the vehicle that appears to have been taken by an image capture device in a direction that is between that of the actual image capture device and the simulated image capture device; and
   displaying the output image produced by the central processing unit on an image display unit mounted in the vehicle.

9. The method of claim 8, wherein the processing of the acquired images by the central processing unit is performed continuously based on the information obtained from the object sensor.

10. The method of claim 8, wherein the image capture device is attached to the rear of the vehicle and includes a wide-angle lens.

11. The method of claim 8, wherein the object sensor comprises an ultrasonic-based object sensor.

12. The method of claim 8, wherein the proportion of the simulated image increases as the distance between the object and the vehicle decreases.

13. The method of claim 8, wherein the proportion is determined using a lookup table.

14. The method of claim 8, wherein combining the simulated image with the acquired image comprises combining the simulated image with the acquired image using morphing techniques.

* * * * *